United States Patent [19]
Goss

[11] Patent Number: 5,121,409
[45] Date of Patent: Jun. 9, 1992

[54] MULTICHANNEL SATELLITE COMMUNICATION AND CONTROL SYSTEM

[75] Inventor: Randall Goss, West Fork, Ark.

[73] Assignee: Artran, Inc., Springdale, Ark.

[21] Appl. No.: 504,294

[22] Filed: Apr. 4, 1990

[51] Int. Cl.⁵ .............................................. H04J 1/00
[52] U.S. Cl. ...................................... 375/1; 370/69.1; 370/75; 455/12.1
[58] Field of Search ................... 370/69.1, 75; 455/12; 375/1

[56] References Cited

U.S. PATENT DOCUMENTS 4,789,980  12/1988  Darcie et al. ................... 370/69.1
4,951,279   8/1990  Hotta .............................. 370/69.1

Primary Examiner—Thomas H. Tarcza
Assistant Examiner—David Cain
Attorney, Agent, or Firm—Robert R. Keegan

[57] ABSTRACT

There is disclosed a control system for receiving multichannel frequency multiplex satellite communication signals with channel identification coding wherein a desired channel can be located and locked-on by its identification code without knowing the channel frequency, including a receiver for satellite signals feeding at least one and preferably three or more voltage tunable demodulators. Each tunable demodualtor has an audio output for voice or data to be utilized locally or retransmitted, and an AFC output monitored by the control system; a respective demodulator is normally tuned to keep the AFC output at approximately 90 percent of its maximum value thereby tracking a received carrier signal. A microprocessor is programmed to detect subaudible frequency or other coding in the audio signal and to produce a tuning voltage bump signal on detection of undesired-channel coding; it also generates a reset signal after tuning voltage has reached maximum value to return tuning voltage to minimum value. The control circuit for the tuning voltage includes a charge integrator charged up or down in response to signals from the microprocessor or the AFC output. A preferred embodiment has up to ten channels with subaudible frequency codes between about 25 Hz and about 100 Hz and the coding detector includes a square wave converter together with a microprocessor program routine for measuring the period of the square wave. The microprocessor compares the square wave period and stored data identifying the desired-channel wave period and, if the comparison fails, controls the tuner to resume scanning.

20 Claims, 4 Drawing Sheets

MULTICHANNEL SATELLITE COMMUNICATION AND CONTROL SYSTEM

The present invention relates to multichannel radio communication systems and particularly to systems for communication via earth satellite wherein it is desired to communicate a multiplicity of audio signals in a frequency multiplex mode over a wider-than-audio frequency band. It is, of course, well known to provide various multiplexing schemes where signals requiring much less than the full available band width of an earth-satellite communication link can be simultaneously transmitted without interference through the use of different assigned carrier frequencies for the various signals. A straightforward procedure for frequency multiplex communication provides a receiver which has separate tuned circuits for each of the carrier frequencies which are to be demodulated. This, of course, requires that each channel's carrier frequency be known so that the receiver demodulator for that carrier can be tuned to, or approximately to, the proper frequency. It is also well known to allow for some drift in the transmitted frequency by providing automatic frequency control circuits in the receiver.

Such systems have long been used satisfactorily for terrestrial communication systems and, to some extent, for satellite communication systems; but, in satellite communications, maintaining the proper tuning for the carrier frequencies in the ground receiver is a considerably more difficult problem. Among the sources of frequency drift or instability are the high frequency (short wavelength) used in satellite communications and the extremes of temperature at the satellite.

The present invention avoids virtually all carrier frequency tuning problems by permitting the receiver to scan through the frequency band of the carrier frequencies, lock on a detected carrier and track any frequency variation of that carrier. The information channel identified with a particular carrier detected is not determined by the carrier frequency or approximate carrier frequency, but, rather, by an identification code embedded in the audio modulation. For the purposes of this discussion, audio frequency will be defined as 20 Hz to 100,000 Hz; subaudible frequencies will be defined as frequencies below 100 Hz; inaudible frequencies will be defined as frequencies below 100 Hz or above 5,000 Hz. It will be seen that subaudible and inaudible in this discussion will not conform to the meaning accorded in physiology, but is rather selected as appropriate to the present system and applications thereof where music and voice are adequately communicated in the range of 100 Hz to 5,000 Hz.

The approach selected in the present system employing channel identification codes rather than fixed carrier frequency assignments for information channels makes it possible to utilize a novel apparatus combination of analog and digital signal processors to achieve the communication mission with great efficiency, notable simplicity, and great reliability. The apparatus utilized in the system differs in a number of its features from well known communication apparatus employing search-and-lock electronic circuitry such as short-wave radio scanners used to monitor police, fire, and other short-wave radio communications.

Search-and-lock scanning radio receivers for other than satellite communication applications have employed motor-driven tuners (Rennenkampf U.S. Pat. No. 2,951,150, Aug. 30, 1960, Cl. 250/20), analog ramp voltage generators (Close U.S. Pat. No. 3,714,580, Jan. 30, 1973, Cl. 325/470), and, more recently, digital counters and digital-to-analog ramp voltage generators (Anderson, et al. U.S. Pat. No. 4,387,401, Jun. 7, 1983, Cl. 358/193.1). Some of these arrangements perform not only the search-and-lock function, but also handle the tracking or automatic frequency control function of the system. In particular, in the digital systems it was known to utilize an up-down counter and step the counter up or down in response to an automatic frequency control signal (Clark U.S. Pat. No. 3,936,753, Feb. 3, 1976, Cl. 325/420; Chin et al. U.S. Pat. No. 4,429,415, Jan. 31, 1984, Cl. 455/164). Unless the counter had extremely fine resolution, such digital systems did not produce very satisfactory automatic frequency control.

In the case of short-wave "scanners" it is frequently desired to scan a particular short-wave radio frequency transmitting band and lock-on any signals which correspond to selected transmitting frequencies. Provisions may be made for giving priority to certain frequencies and other refinements may be present in the system (Brown et al. U.S. Pat. No. 4,000,468, Dec. 28, 1976, Cl. 325/335). However, the identification of the signal can be made solely on the basis of transmitting frequency, and, if the transmitting frequency is not within a relatively small tolerance, the transmitted signal will not be recognized.

Other communication systems have been devised in which time multiplex signals have been identified as to source by encoding which is inaudible or otherwise does not interfere with the voice or data being communicated (Gladden et al. U.S. Pat. No. 4,152,647, Mar. 1, 1979, Cl. 325/4). Such apparatus is not, however, adaptable to providing simple, efficient, reliable, and inexpensive frequency multiplex multichannel satellite communication control systems as provided by the present invention.

The system according to the present invention differs from previous apparatus in a number of its features. Each of the multiplicity of frequency multiplex channels is identified at the receiver solely by an identification code embedded in the audio modulation. While the transmitted frequencies will normally have predetermined frequency allocations with spacing or guard bands between channel frequencies so that adjacent channel interference will be avoided, the receiver is totally unconcerned with frequency allocation and will properly receive a designated channel even if that channel frequency drifts entirely outside its allocated frequency band. This is accomplished in the present system because the system searches for transmitted signals and locks onto the signal while determining the channel identification code. If the code indicates an unwanted channel, the system unlocks from that frequency and continues the scan.

In the present system the voltage ramp for the voltage control oscillator of the demodulator is generated in a charge integrator including an operational amplifier. This is in contrast to other systems utilizing an up-down counter and a digital-to-analog converter. The advantage of the charge integrator is most apparent in the tracking or automatic frequency control mode where the "steps" of voltage change, and hence the frequency changes in the tracking mode, are almost infinitesimal. This contrasts with the digital ramp arrangement where in the tracking mode there is a "dither" of substantial magnitude above and below the target frequency control voltage and a corresponding "dither" in the frequency.

The present system also utilizes a very simple and reliable unlocking technique for rejecting unwanted channels as identified by their channel identification code signal. When the demodulator tunes through a transmitter carrier signal, the automatic frequency control voltage output of the demodulator experiences a peak, and the target frequency for tracking purposes is set to at least 90 per cent of the peak automatic frequency control voltage on the low frequency side of the maximum (assuming search scan is from low to high frequency). The analog feedback tracking loop can readily maintain the control voltage within no more than one or two percent of the maximum, and thus the maximum automatic frequency control voltage will not be reached in the tracking mode. The system unlocks the tracking mode by "bumping" the tuning voltage by an amount sufficient to move the frequency to the high frequency side of the AFC voltage maximum sufficiently far out on the skirt of the peak to be below the target AFC voltage. The system then perceives a necessity to increase the tuning voltage to seek the target with the result that the frequency is increased past the previously encountered carrier signal and continues to be increased until another carrier signal is encountered.

The detection of channel identification code is accomplished by a microprocessor fed by a square-wave converter allowing it to generate a count proportional to the period of the subaudible channel identification code. This is compared with the desired-channel data input to the microprocessor, and a failure of comparison causes the "bump" signal to be provided to the charge integrator. Preferably the microprocessor also handles the function of resetting the charge integrator to the minimum when it has increased to the top of the voltage range corresponding to the maximum frequency within the frequency band.

In addition to providing the above features and advantages, it is an object of the present invention to provide a multichannel radio communication system for communication via earth satellite wherein the receiver control system selects a desired one of a multiplicity of frequency multiplex channels solely by a channel designation code in the audio frequency thereof and without regard to the exact transmission frequency.

It is another object of the present invention to provide a multichannel communication system particularly adapted to earth satellite-relayed microwave radio transmissions wherein each channel transmitted has a unique embedded channel indentification code and the receiver scans through all channels to locate and lock-on a desired channel selectable at the receiving station, the receiver having a voltage controlled tuning circuit and a charge integrator for producing a tuning voltage performing the combined functions of scanning, locking, tracking, and restarting the tuning voltage.

It is another object of the present invention to provide such a communication and control system wherein a microprocessor is provided which functions, at least in part, to identify the channel coding component of a received audio signal and to direct signals to the charge integrator circuit to unlock from undesired channels.

It is still another object of the present invention to provide such communication and control systems with a locking and tracking function performed by the charge integrator by maintaining the frequency control voltage at a level that will keep the automatic frequency control output from a tunable demodulator at a predetermined value from 90 to 100 percent of its maximum value.

Other objects and advantages of the invention will be apparent from consideration of the following description in conjunction with the appended drawings in which FIG. 1 is a schematic block diagram of a multichannel satellite communication and control system according to the invention;

Figure 1:
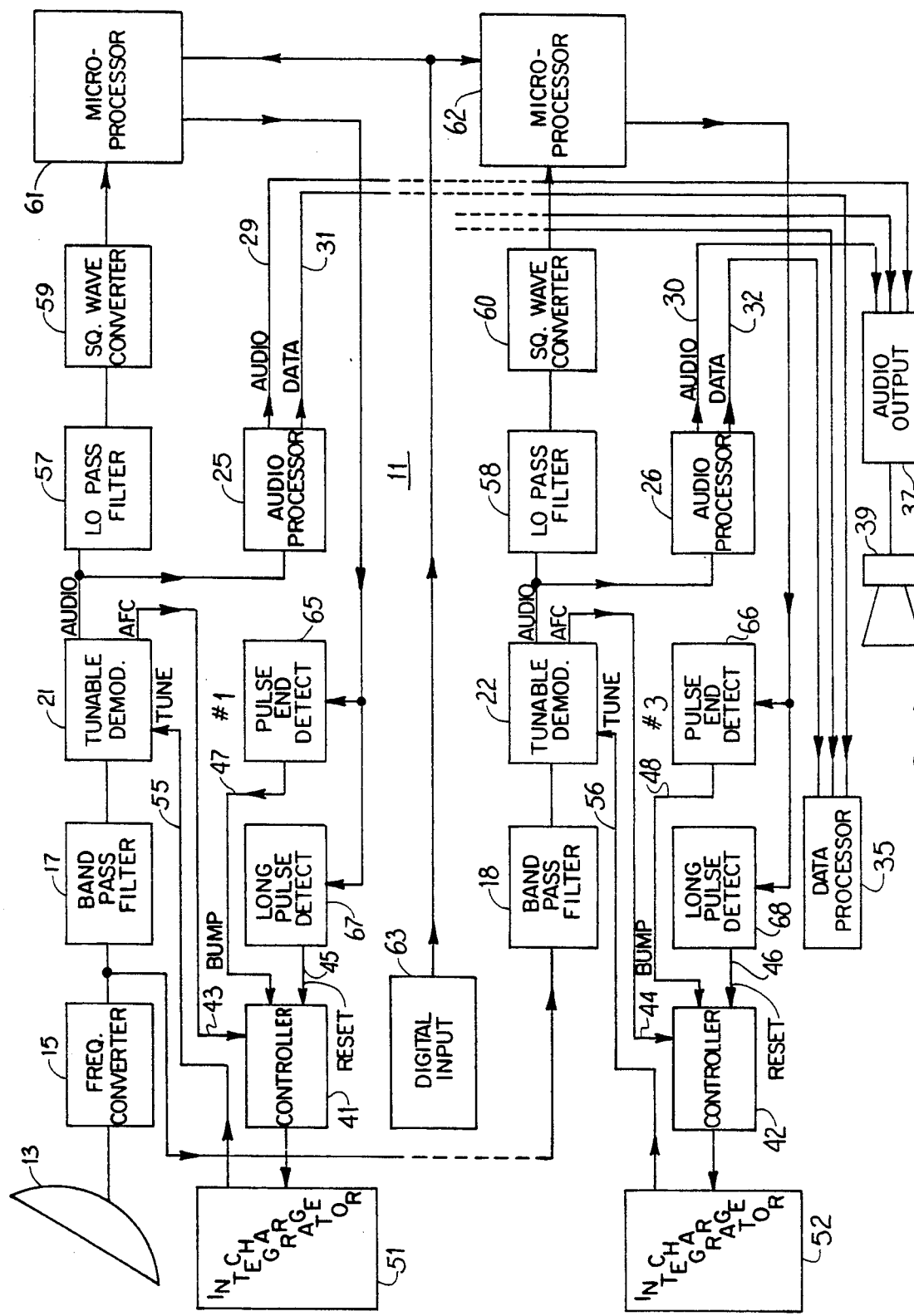

Referring now to the drawings and particularly to FIG. 1, the system illustrated has the capability of receiving three or more separate channels simultaneously and, for simplicity, only the first and the last (third) of the identical signal processing and control units are shown. In the illustrated embodiment, the three channels could be utilized to convey separate voice, music or numeric information to a multiplicity of widely distributed facilities of a company, government agency or the like. The band width, and hence the information carrying capacity of the individual channels, would be at least equivalent to a normal telephone communication line, and, in most cases, would be much greater.

The illustrated embodiment contemplates an earth satellite-relayed "C" or "Ku" band microwave radio transmission in a frequency multiplex mode. Microwave radio transmissions are received by the communication and control system 11 with a conventional earth station parabolic antenna 13 (and its associated low-noise receiver). The received signal from the antenna 13 is fed by coaxial cable or other suitable means to a frequency converter 15 which converts the UHF signals from the antenna station 13 to an intermediate frequency, typically of 70 MHz. This 70 MHz IF signal is distributed internally to the No. 1 through No. 3 channel demodulator sections, first entering respective band pass filters 17, 18.

Each band pass filter 17, 18 feeds a tunable demodulator 21, 22; the portion of the system thus far described with reference to FIG. 1 is generally conventional. Tunable demodulators 21, 22 may consist essentially of an integrated circuit chip (such as a 7000 sold by Signetics, a 3356 sold by Motorola or an equivalent). Such demodulator chips are common and well known, however, their inputs and outputs can be modified and arranged in numerous different ways to customize the operation of the tunable demodulator. For the purposes of this explanation, each tunable demodulator 21, 22 has an audio output to an audio processor 25, 26 together with an AFC output 43, 44 and a tuning input 55, 56.

The audio processors 25, 26 serve the function of separating and conveying audio voice or music on respective transmission paths 29, 30, separating digital data information, if present, and conveying it on transmission paths 31, 32. In simple systems according to the invention, audio processors 25, 26 may be unnecessary and may be omitted.

In the illustrated embodiment, the outputs from such audio processors 25, 26 (and others) are transmitted to a data processor 35 or an audio output unit 37 for further utilization as by a public address system illustrated by loudspeaker 39.

Figure 3:
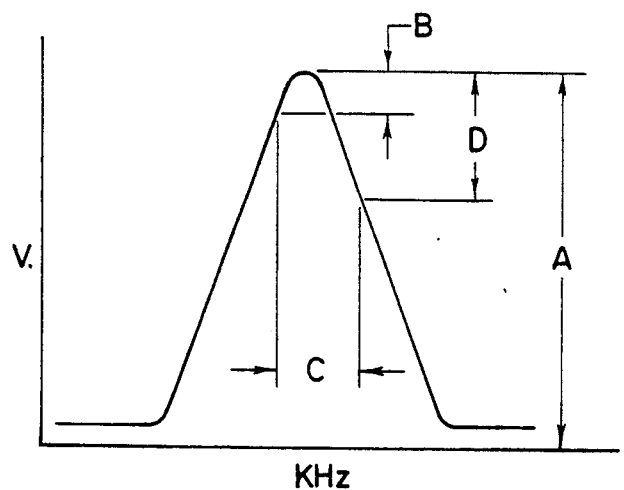
FIG. 3 is a waveform diagram useful in explaining the frequency control function of the invention.

As seen in FIG. 3, the AFC outputs 43, 44 are low voltage analog signals which have a very low value in the absence of a received carrier near the frequency to which tunable demodulator 21, 22 is tuned. In FIG. 3, frequency is plotted horizontally and AFC signal voltage is plotted vertically. As the frequency of tunable demodulator 21, 22 passes through a received carrier signal frequency, the peak as shown in FIG. 3 marks the correspondence between demodulator 21 tuned frequency and the frequency of the carrier being received. By way of example, the peak voltage A of the AFC signal illustrated in FIG. 3 may be 4 volts.

The AFC voltage signal from each tunable demodulator 21, 22 is transmitted on lead 43, 44 to a respective controller circuit 41, 42, controlling a charge integrator 51, 52. A tuning signal for each tunable demodulator 21, 22 on transmission path 55, 56 is provided from the charge integrator 51, 52 thus completing a control loop for automatic frequency control and tracking of a received channel carrier signal.

Figure 4:
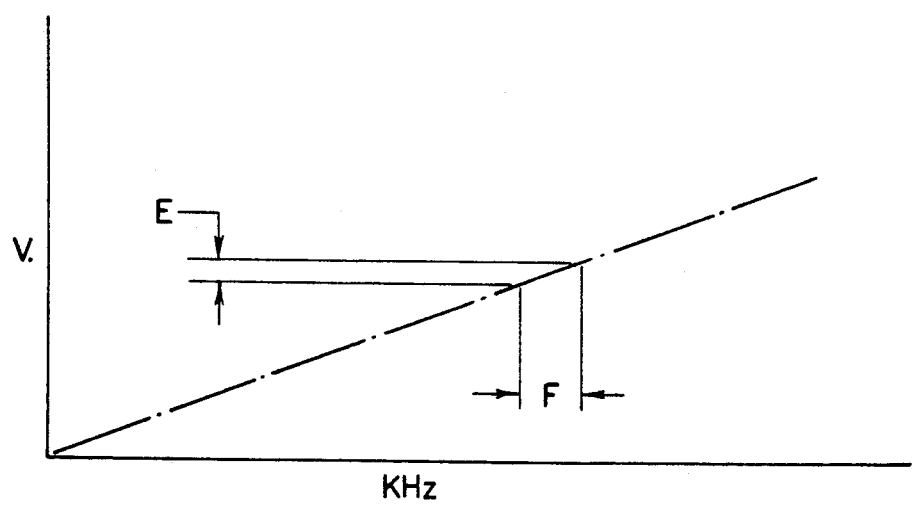
FIG. 4 is a graph of tuning voltage useful in explaining the scanning function of the invention.

Each controller circuit 41, 42 in FIG. 1 responds to a low AFC signal by causing the charge integrator 51, 52 to charge to a higher voltage in a generally linear fashion. See FIG. 4. The charge rate may be such as to scan the entire frequency band of tunable demodulator 21, 22 in from one to ten seconds. The frequency range of the tunable demodulator scan may be 5 MHz, for example.

As the tunable demodulator 21, 22 scans up in frequency, it will encounter any received carrier frequency present at which time the automatic frequency control voltage will increase as shown in FIG. 3. The controller circuit 41, 42 is designed to switch the signal supplied to charge integrator 51, 52 from an up-charge signal to a down-charge signal when the AFC voltage it receives exceeds a predetermined value, preferably from about 90 to 100 percent of the AFC peak voltage. It will be noted that the voltage difference B, not more than 10 percent and usually about 3 percent of voltage A, causes the upward frequency scan to be stopped before crossing to the high frequency side of the AFC peak. Thus the feedback from the controller circuit 41, 42 and charge integrator 51, 52 to the tunable demodulator 21, 22 holds the tuned frequency just below and very close to the center frequency represented by the peak of the AFC voltage. This condition will be maintained so long as the controller circuit 41, 42 is in the normal scan-and-lock mode, i.e. its only input is on input lead 43, 44 receiving the automatic frequency control voltage from the tunable demodulator 21, 22.

The audio output from tunable demodulators 21, 22 also is connected through respective low pass filters 57, 58 to respective square-wave converters 59, 60. The output of each square-wave converter 59, 60 is a square-wave pulsed output with a period the same as that of the respective subaudible channel identification frequency code, if any, present in the audio output from the tunable demodulator 21 or 22; and it is transmitted to an input port of corresponding microprocessor 61, 62. Microprocessor 61, 62 is programmed in a generally conventional manner to produce a timing pulse count from the beginning of one square-wave pulse to the beginning of the next square-wave pulse so that the microprocessor count is directly proportional to the period (and inversely proportional to the frequency) of the channel identification subaudible frequency code.

Microprocessor 61 and microprocessor 62 are provided with input data for designating the designed subaudible frequency code for their particular channels from a digital input 63 such as a keypad, for example. If the frequency code received from its square-wave converter 59, 60 is not the desired channel, then microprocessor 61, 62 generates and transmits a signal consisting of a short pulse to a pulse end detector 65, 66. At the end of the short pulse, a bump pulse is transmitted over path 47, 48 to the controller circuit 41, 42 which responds by increasing the tuning voltage output of charge pump 51, 52 in small step. This is illustracted in FIG. 4 where a voltage increase E at the tune input for demodulator 21, 22 is shown producing a frequency increase F. A corresponding frequency increase is shown in FIG. 3 at C due to a bump signal initiated from the microprocessor 61, 62.

As seen in FIG. 3, the relatively small increase in frequency indicated at C causes the AFC signal to drop by an amount D below the AFC maximum A. The voltage difference D is substantially greater than the voltage difference B bringing the AFC voltage below the target voltage. Thus, the controller circuit 41, 42 issues an up-charge signal to the charge integrators 51, 52 as previously explained. However, this only causes the AFC voltage to become smaller on the high frequency side of the AFC wave form peak and causing the frequency to increase until another peak is encounted at the carrier frequency of a different channel's carrier. This process is repeated until the microprocessor finds the desired channel, at which time it does not initiate a bump signal and the previously explained automatic frequency control function maintains the tunable demodulator tuned to the desired frequency.

It will be understood that at start-up, the microprocessor causes the tuning voltage to be set to a minimal value before the controller circuit 41, 42 commences the upward frequency scan. The reset signal from the microprocessor is a long duration pulse, ten or more times longer than the bump initiating pulse previously described. Long pulse detect circuits 67, 68 do not respond to a short bump-initiating pulse from the microprocessor, but respond to the longer reset initiating pulse to convey a reset signal to controller circuit 41. The reset is accomplished by rapid down charge of charge integrator 51, 52.

In addition to sending a reset initiating long pulse at start-up of the system, the microprocessor also times the period during which no square-wave signal is received from the square-wave converter 59, 60. When this time has been sufficient for normal capture of a carrier (about 1 to 2 seconds), microprocessor 61, 62 sends a bump initiating signal as described above. After ten bump initiating signals, microprocessor 61, 62 sends a long reset-initiating pulse to the long pulse detector 67 causing the frequency to be returned to near minimum value as previously described. In either case, it may be noted that the pulse-end detector circuit 65, 66 will generate a superfluous bump signal right after the reset pulse, but it has no adverse effect on the operation of the system.

While separate microprocessors have been shown (61 and 62 for channels No. 1 and No. 3), a single microprocessor is readily able to handle the channel code identification process and other digital processing functions for at least three channels of the illustrated system on a time-sharing basis. Furthermore, a microprocessor such as 61 may be programmed to perform such other functions as volume control of the audio signals, selection of audio signals for transmission to a public address system, or the like.

While the system illustrated in FIG. 1 is capable of receiving three separate information channels simultaneously, it is clear that the tunable demodulator elements and the controls therefor could be further replicated to simultaneously receive a number of information channels greater than three. In the preferred embodiment, the tunable demodulators 21, 22 are capable of tuning through the frequency range of about 68 MHz to 73 MHz. Assuming that each multiplex signal carrier in this band is to be frequency modulated with an audio signal having a top frequency of from 6,000 to 8,000 Hz, there is ample room for at least eight well-separated carried signals in the 68 to 73 MHz band. Using subaudible frequency coding for each channel carrier such as frequency codes of 35 Hz, 40 Hz, 45 Hz, 50 Hz, 55 Hz, 60 Hz, 70 Hz, and 80 Hz, there are at least eight available subaudible frequencies for coding without resorting to more sophisticated coding techniques. Simple frequency or tone coding is very effective but could be replaced by pulse width coding, binary coding, or other known expedients.

Thus while the system of FIG. 1 was described in contemplation that there would be only three multiplex single carriers transmitted and all three would be simultaneously received, it is quite feasible to transmit at least eight multiplex carrier signals, in which case the system of FIG. 1 could receive simultaneously any selected three of the eight transmitted signals. The selection of signals to be received (and also volume control, etc.) may be controlled through digital inputs 63, or such action could be controlled from the transmitter if data-processor 35 were provided with an output to microprocessor 61, 62, for example.

A particular advantage of the present system is its immunity to frequency drift of the signal transmitted from the earth satellite. In the specific example the multiplex carrier signals might be separated by several hundred KHz. Even if the group of carrier signals was shifted by this amount due to frequency drift of the satellite transmission, there would be not adverse effect on the receiver according to the present invention because it does not rely on the radio transmission frequency to locate or even to identify a particular carrier signal. Any shift of the radio frequency can be tolerated and essentially ignored so long as the highest carrier frequency or the lowest carrier frequency is not shifted out of the range of band pass filter 17, 18 or tunable demodulator 21, 22.

Figure 2:
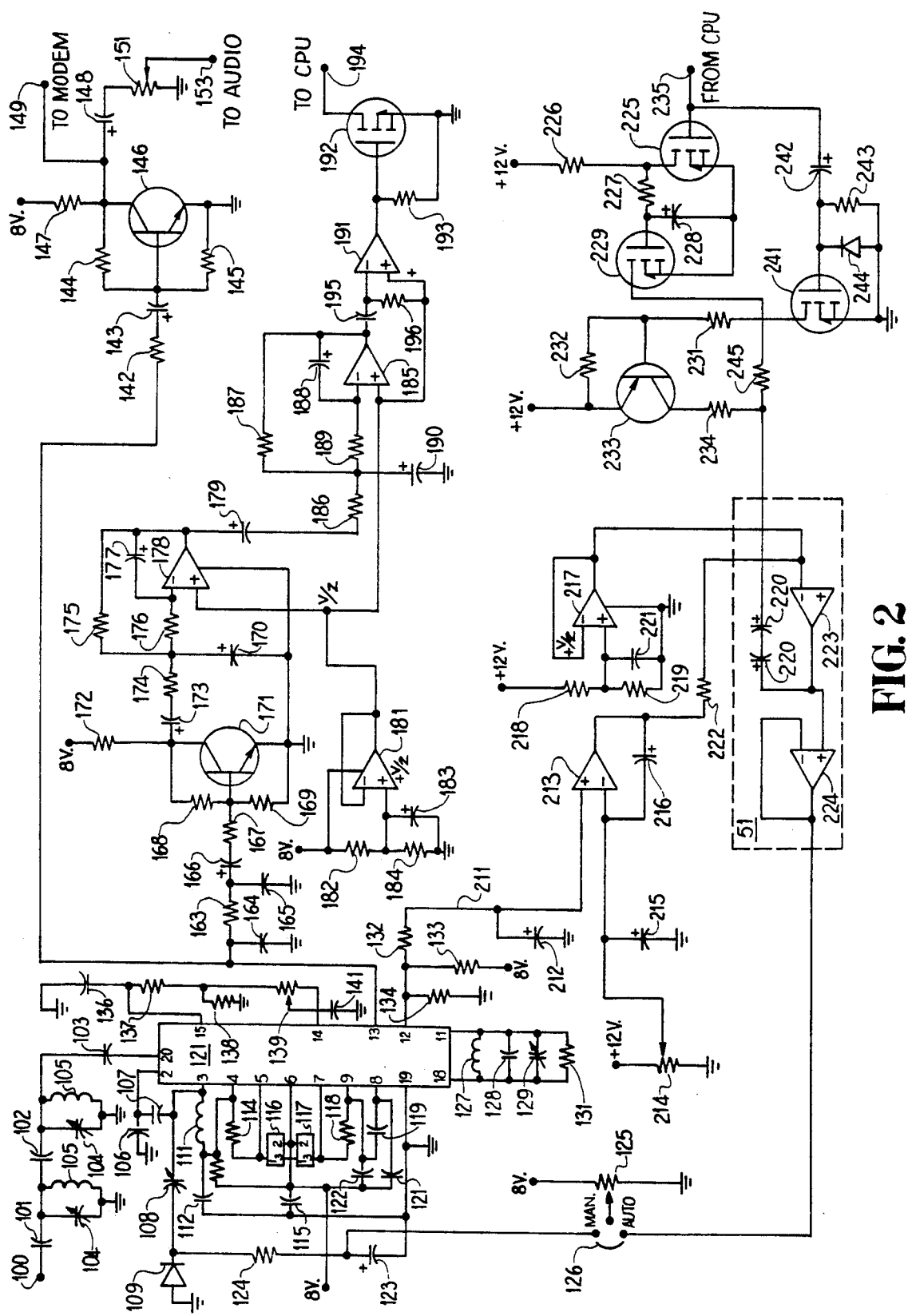
FIG. 2 is a schematic circuit diagram for implementing the system illustrated in FIG. 1.

A preferred implementation of a communication control system according to the invention is illustrated in detail in the schematic circuit diagram of FIG. 2. The conventional satellite antenna and receiver are not illustrated in FIG. 2, but the radio frequency signal therefrom is received at an input terminal 100 and passes through a band pass filter section consisting of passive pi filters formed of variable capacitors 104, fixed inductors 105 and fixed capacitors 101, 102, 103.

The signal passes from the band pass filter section into a conventional tunable demodulator integrated circuit chip 121 which may be a No. 7000 Signetics brand or a No. 3356 Motorola brand integrated circuit chip. The external circuit of tunable demodulator 121 includes a local oscillator formed of fixed inductor 111, variable capacitor 108 and voltage tunable diode 109.

As previously mentioned, integrated circuit chip 121 has operating characteristics which are modified by connection of resistor, capacitor, or inductor elements in accordance with the integrated circuit ship specifications. These functions are accomplished by capacitors 106, 107, 115, 112, 122, 120, 119, 128, and 129; resistors 113, 114, 118, 131; and fixed inductor 127. Ceramic filters 116 and 117 also are utilized to set the parameters for the integrated circuit 121. Pins fourteen and fifteen of the integrated circuit chip are connected to a conventional squelch circuit arrangement including capacitor 136, resistors 137 and 138, variable resistor 139 and capacitor 141.

The audio output from tunable demodulator chip 121 (pin thirteen) is directed to an audio buffer circuit including transistor 146 and its associated circuit elements resistor 142, capacitor 143, and resistors 144, 145, and 147. An output from the audio buffer is directed to an output terminal 149 leading to a modem for demodulating data signals, if present. An output is also directed through a coupling capacitor 148 to a potentiometer 151 serving as an audio level set. The signal from audio level potentiometer 151 is output to a terminal 153 constituting the audio output from the channel demodulator of FIG. 2.

The audio output from pin thirteen of tunable demodulator chip 121 is also directed through a passive low pass filter consisting of capacitors 164, 165 and resistor 163, then through a buffer and signal amplifier circuit consisting of transistor 171 and the circuit elements associated therewith including coupling capacitor 166, and resistors 167, 168, 169 and 172. The buffer circuit implemented with transistor 171 has a signal output through coupling capacitor 173 to an operational amplifier circuit consisting of amplifier 178 and the associated circuit elements. Operational amplifier 178 and its associated circuit elements serve as an active low pass filter; such associated elements include resistors 174, 175, and 176 and capacitors 170, 177, and 179.

The output of the circuit of operational amplifier 178 is directed to a second similar operational amplifier 185 with a similar associated circuit element arrangement providing an active low pass filter second stage. The circuit elements associated with operational amplifier 185 include resistors 186, 187 and 189 together with capacitors 188, 190 and 195.

An operational amplifier 191 and its associated circuit elements are configured as a sine wave to square wave converter receiving its input through coupling capacitor 195. Resistor 196 is associated with operational amplifier 191 to configure it to its square wave converter function.

A field effect transistor 192 receives the output of operational amplifier 191 and serves as a level shifter to provide the desired output at terminal 194 to the microprocessor or CPU. A resistor 193 serves as a gate loading resistor for field effect transistor 192.

Operational amplifiers 178, 185, and 191 are provided at their non-inverting input with a voltage of approximately 4 volts generated by a V/2 generator including operational amplifier 181 together with its associated circuit resistors 182 and 184 and capacitor 183.

The output from pin twelve of tunable demodulator chip 121 is an AFC signal biased to approximately 4 volts by resistors 133 and 134. The AFC signal is fed through current limiting resistor 132 over lead 211 to a controller circuit section including an operational amplifier 213 and its associated circuit elements. Capacitors 212 and 215 are provided for operational amplifier 213 as filter capacitors and a capacitor 216 in the feedback circuit of operational amplifier 213 acts as a damping element. The circuit of amplifier 213 acts as an error amplifier or voltage sensitive switch. A potentiometer 214 also provides an input to operational amplifier 213 which serves to set the target voltage for the AFC signal of demodulator chip 121. As explained with reference to FIG. 1 and FIG. 3, the target voltage is set by an amount B less than the maximum voltage of the AFC signal indicated at A (B is preferably less than 10 percent of A and usually about 3 percent of A). However, it should be pointed out that a circuit according to the invention can be configured either to sweep up in frequency and be reset to the minimum frequency to repeat the cycle, or it may be configured in the opposite manner so that the initial condition is at maximum frequency. In such case, the frequency is swept down, and the reset function serves to return the frequency to the maximum value. This latter down-sweep or down-scan configuration is used in the detailed schematic circuit diagram of FIG. 2.

The function of the circuit associated with operational amplifer 213 is to produce a charge-up or a charge-down function for the charge integrator section illustrated in the dashed-line box designated 51. The output of operational amplifier 213 is connected through resistor 222 to the input of operational amplifier 223 which is connected as an integrator by operation of a pair of (oppositely polarized) capacitors 220 in the feedback circuit. Operational amplifier 224 serves as a buffer sending the output from the charge integrator 51 through a switch 126 and resistor 124 to the tuning voltage input of the tunable demodulator at voltage tunable diode 109. A capacitor 123 serves as a filter capacitor for this input.

Switch 126 may be switched from the automatic to the manual position to place potentiometer 125 (which is connected to an 8 colt supply) as a tuning voltage input to the tunable demodulator thereby allowing manual tuning for test purposes or other purposes.

Operational amplifier 217 is connected to provide a V/2 reference to operational amplifier 223 in a manner similar to that previously explained with respect to operational amplifier 181. Operational amplifier 217 has associated therewith resistors 218 and 219 together with capacitor 221.

The portions of the circuit thus far described will serve to scan down in frequency from the maximum frequency as charge integrator 223 charges down until an AFC signal from tunable demodulator chip 121 is encountered at which time it will lock-on the carrier and track it by maintaining the AFC voltage at the target voltage very near the maximum AFC voltage at the center frequency of the carrier. The other important functions of the circuit of FIG. 2 are to reset the frequency scan to the high frequency, as called for, and to unlock the charge integrator circuit from one carrier signal to permit it to proceed with the frequency scan.

As previously described, the microprocessor (CPU) receives an input signal from the square-wave converter. This signal is digitally processed by the microprocessor and a determination is made as to whether the square-wave represents a desired-channel code, an undesired-channel code, or no detected subaudible codes. In the preferred embodiment of FIG. 2 a single output line from the CPU at 235 is utilized to transmit both reset instructions and bump signal instructions to the charge integrator, all as previously described with reference to FIG. 1. A long pulse from the microprocessor on the order of from one-half second to one second is designated as a reset instruction and a much shorter pulse, on the order of from 50 to 100 milliseconds, is designated as a bump initiating signal from the microprocessor. These signals are input over line 235 to a long pulse detect circuit section comprising transistors 225 and 229 and associated circuit elements and to pulse end detection circuit section comprising transistors 233 and 241 and their circuit components.

Transistor 225 together with associated resistor 226 serves as an inverter for transistor 229 which has in its input a resistor 227 and a capacitor 228 serving an RC delay function. Thus there is no effect on transistor 229 by short pulses of the order of 50 to 100 milliseconds. The long duration signal output from transistor 229 through resistor 245 serves to reset the charge integrator to full voltage, and hence resets the frequency scan to the highest frequency.

The output on the line 235 also is fed to transistor 241 through a capacitor 242 acting as a differentiating capacitor and a pulse end or trailing edge detector. A diode 244 and a resistor 243 serve to eliminate unwanted negative biases produced, for example, by the leading edge of a short input pulse, yet producing a sharp output signal at the pulse end. Transistor 241 drives a current source transistor 233 which, together with its associated elements resistors 232, 231, and 234 provides the "bump" current for charge integrator 51. The value of resistor 243 essentially determines the magnitude of the "bump" in the output of the charge integrator, and hence the magnitude of "bump" in the frequency. If desired, this resistor can be a variable resistor to aid in production or calibration of the circuit.

It will be understood that FIG. 2 shows a detailed schematic circuit diagram for demodulator and control circuitry for only one of the multiplex channels and this circuitry would be replicated for each of the channels which was to be received simultaneously by the system. Correlating this with FIG. 1, there are control and demodulator units for three simultaneously received channels (only two of which are illustrated). It should be noted that there is no provision for setting channel frequency or channel identification code in the hardware, and none is required. This function is handled in the microprocessor or CPU software routines.

One advantage of the circuitry shown in detail in FIG. 2 is that for each channel only a single outgoing and a single incoming signal path to the microprocessor is required. Of course, one could have a greater number of signal paths for these and other signals passing to and from the microprocessor, if that was found to be desirable. The fact that the circuit of FIG. 2 has only one incoming and one outgoing signal path also makes it more practical to substitute a single microprocessor for the three microprocessors that would be required for the system of FIG. 1 and programming the microprocessor to do the digital processing for all three channels on a time-sharing basis: TABLE 1 below shows suitable circuit element values and part nos. for the circuit of FIG. 2.

Figure 5:
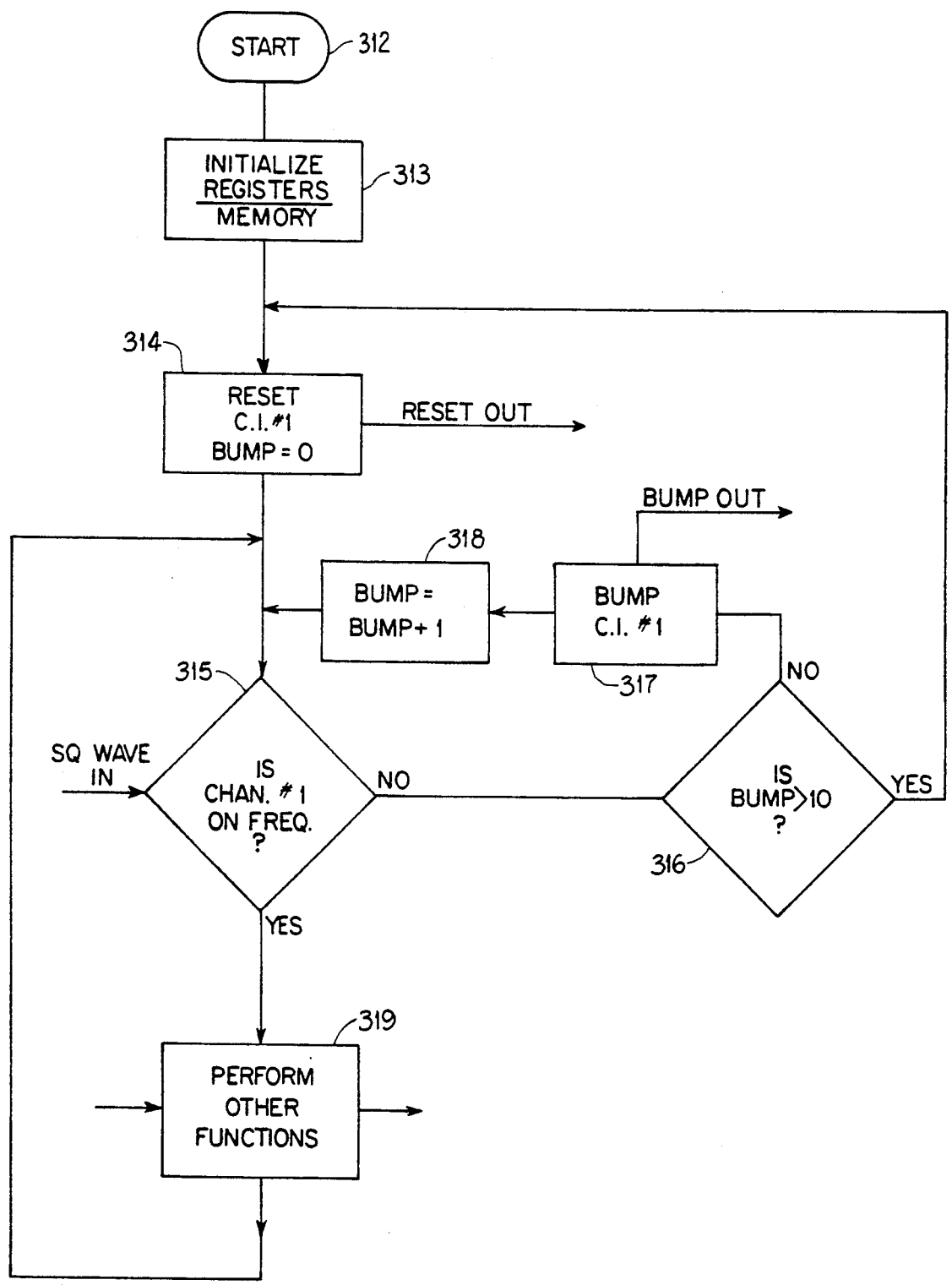
FIG. 5 is a microprocessor program flow chart.

FIG. 5 shows a flow diagram for the computer program to implement the functions performed by microprocessor 61, but it also is appropriate for microprocessor 62 and other microprocessors of the system.

The start block 312 represents the turn-on or power-up of the system immediately following which the program performs all required initialization steps as indicated in block 313. The program then proceeds to reset charge integrator 51 by sending an appropriate signal, and a bump counting register is set to zero. In block 315 the input from square-wave converter 59 is processed and the period determined to evaluate whether channel No. 1 is detecting the appropriate subaudible identification code within a prescribed tolerance. If the answer is no, execution passes to block 316 which checks whether the counter for bump signal transmissions is greater than ten. If the bump counter is greater than ten, execution returns to block 314 resetting the charge integrator to start position and hence restarting the frequency scan.

If the bump counter is less than ten, block 317 executes a bump out function to charge integrator 51 and the bump counter is incremented in block 318. This process is then repeated commencing with block 315 testing the identification code of the squarewave input. To obtain the desired timing for the loop consisting of blocks 315-318, it will usually be desirable to incorporate delay functions in one or more of the blocks in a conventional manner.

TABLE I

| REF. NO. | VAL. | PART NO. |
|---|---|---|
| AMP'S: | | |
| 178 | | LM324 National Semiconductor |
| 181 | | LM324 National Semiconductor |
| 185 | | LM324 National Semiconductor |
| 191 | | LM324 National Semiconductor |
| 213 | | LM324 National Semiconductor |
| 217 | | LM324 National Semiconductor |
| 223 | | LM324 National Semiconductor |
| 224 | | LM324 National Semiconductor |
| TRANSISTORS: | | |
| 146 | | MPSA18 |
| 171 | | MPSA18 |
| 192 | | VN0300 |
| 225 | | VN0300 |
| 229 | | VN0300 |
| 233 | | MPSA56 |
| 241 | | VN0300 |
| IC's: | | |
| 116 | 10.7 MHz | Ceramic Filter |
| 117 | 10.7 MHz | Ceramic Filter |
| 121 | | 3356 MOTOROLA |
| DIODES: | | |
| 109 | 50V | |
| 244 | 50V | |
| RESISTORS: (ohms) | | |
| 113 | 150 | |
| 114 | 330 | |
| 118 | 330 | |
| 124 | 10K | |
| 131 | 4.7K | |
| 132 | 100K | |
| 133 | 27K | |
| 134 | 27K | |
| 137 | 220K | |
| RESISTORS: | | |
| 138 | 3.3K | |
| 142 | 15K | |
| 144 | 100K | |
| 145 | 47K | |
| 147 | 2.2K | |
| 163 | 2.2K | |
| 167 | 10K | |
| 168 | 100K | |
| 169 | 47K | |
| 172 | 1K | |
| 174 | 6.2K | |
| 175 | 6.2K | |
| 176 | 6.2K | |
| 182 | 10K | |
| 184 | 10K | |
| 186 | 6.2K | |
| 187 | 6.2K | |
| 189 | 6.2K | |

TABLE I-continued

| REF. NO. | VAL. | PART NO. |
|---|---|---|
| 193 | 100K | |
| 196 | 820K | |
| 218 | 10K | |
| 219 | 10K | |
| 222 | 1M | |
| 226 | 10K | |
| 227 | 220K | |
| 231 | 10K | |
| 232 | 100K | |
| 234 | 220K | |
| 243 | 47K | |
| 245 | 22K | |
| POTENTIOMETER'S: (ohms) | | |
| 125 | 10K | |
| 139 | 5K | |
| 151 | 10K | |
| 214 | 100K | |
| CAPACITORS: (microfarads, or pf) | | |
| 101 | 5 pf | |
| 102 | 1 pf | |
| 103 | 20 pf | |
| CAPACITORS: | | |
| 104 | 4.5-20 | |
| 106 | 20 pf | |
| 107 | 5 pf | |
| 108 | 6.45 pf | |
| 112 | .01 | |
| 115 | .01 | |
| 119 | .01 | |
| 120 | .01 | |
| 122 | .01 | |
| 123 | .47 pf | |
| 128 | 68 pf | |
| 129 | 4.5-20 | |
| 136 | .1 | |
| 141 | .1 | |
| 143 | 1 | |
| 148 | 2.2 | |
| 164 | 470 pf | |
| 165 | .033 | |
| 166 | 10 | |
| 170 | 1 | |
| 173 | 4.7 | |
| 177 | .22 | |
| 179 | 4.7 | |
| 183 | 1 | |
| 188 | .22 | |
| 190 | 1 | |
| 195 | .1 | |
| 212 | 4.7 | |
| 215 | .47 | |
| 216 | .1 | |
| 220 | 47 | |
| 221 | 1 | |
| 228 | 10 | |
| 242 | 10 | |
| INDUCTORS: (microhenrys) | | |
| 105 | .18 | |
| 111 | .18 | |
| 127 | 2.7 | |

Execution proceeds through the loops described until the channel No. 1 identification code is received, at which time execution passes to block 319 which represents any other functions which one may desire that the microprocessor 61 perform. These other functions may require anywhere from a few milliseconds to several seconds after which execution is returned to block 315 to again confirm that channel No. 1 is locked-on the proper transmissions frequency and receiving its allocated identification code. Although not shown in FIG. 5, digital input signals from digital input 63 may be received in block 315 to determine the channel identification code to which block 315 will respond.

It has been mentioned that microprocessor 61, 62 and other microprocessors may have their separate functions performed by a single microprocessor on a time-sharing basis. In such case, the flow diagram of FIG. 5 would show a replication of blocks 314 through 318 for each additional channel being monitored by the microprocessor. These additional routines would immediately precede block 319. Accordingly, the process described above with respect to channel No. 1 would be repeated for channel No. 2, channel No. 3 and any other channels before passing execution to block 319 to perform other functions and return the execution to block 315.

It will be apparent that the relatively simple program routines of FIG. 5 can be made much more complex and altered to provide many refinements by those of ordinary skill in the art, all within the scope of the present invention.

From the foregoing description it will be appreciated that a multichannel satellite communication and control system is provided by the present invention which is simple and reliable and yet overcomes particular problems previously encountered, especially in connection with frequency multiplex audio signal transmission over earth satellite transponder communication links.

In addition to the variations and modifications to the system which have been described or suggested, other variations and modifications of the system will be apparent to those skilled in the art and, accordingly, the scope of the invention is not to be considered limited to the embodiments and variations thereof shown or suggested, but is rather to be determined by reference to the appended claims.

What is claimed is:

1. A control system for receiving multichannel frequency multiplex satellite communication signals with channel identification subaudible frequency coding comprising
    a radio receiver for receiving signals at communication satellite frequencies;
    a radio frequency down-converter connected to receive the output of said receiver and having an output at a lower radio frequency;
    a band pass filter connected to filter the output of said radio frequency down-converter;
    a tunable demodulator having a radio frequency input, a voltage-tuned local oscillator with a tuning input, an audio output, and an automatic frequency control output, said radio frequency input being connected to receive the filtered signal from said band pass filter;
    an audioprocessing circuit connected to receive a signal from said audio output;
    a low pass filter connected to receive a signal from said audio output and having an output for subaudible frequencies between about 25 Hz and about 100 Hz;
    a square wave converter connected to the output of said low pass filter for producing a square wave with a subaudible frequency corresponding to a frequency component of the demodulator audio output signal;
    a microprocessor connected to said square wave converter for digitally processing and determining the period of the square wave and programmed to produce output signals in response to detection of desired-channel wave period identification, and undesired-channel wave period identification;
    a charge integrator having an up-down input, a bump input, and a reset input, said charge integrator having an output connected to said tunable demodulator tuning input, said bump input and said reset input being connected to receive output signals from said microprocessor;
    means for receiving said automatic frequency control output of said tunable demodulator and controlling said charge integrator to charge up when said automatic frequency control output is below a predetermined target level and to charge down when it is above said target level;
    said microprocessor being programmed to store desired-channel wave period data from an input thereof, to compare said dat with the determined period of said square wave, and to send a bump signal to said charge integrator in response to failure of the comparison, said microprocessor being further programmed to send a reset signal to said charge integrator after a predetermined time interval without a positive comparison of said data with the period of said square wave;
    whereby a desired frequency multiplex channel signal can be located and locked-on by use of its channel identification coding without knowledge of the frequency at which said desired frequency multiplex channel signal is transmitted.

2. Apparatus as recited in claim 1 wherein said charge integrator comprises a semiconductor operational amplifier circuit.

3. Apparatus as recited in claim 1 wherein said automatic frequency control output target level is not more than 10 per cent below the maximum automatic frequency control output.

4. Apparatus as recited in claim 1 wherein said audio processing circuit includes means for separating a high frequency data carrier signal from said audio output.

5. Apparatus as recited in claim 1 wherein said bump signal is a short duration pulse and said reset signal is a long duration pulse.

6. A control system for receiving multichannel frequency multiplex satellite communication signals with channel identification coding comprising
    a radio receiver for receiving signals at communication satellite frequencies;
    a radio frequency converter connected to receive the output of said receiver and having an output at a lower frequency;
    a band pass filter connected to filter the output of said radio frequency converter;
    a tunable demodulator having a radio frequency input, a tuning input, an audio output, and an automatic frequency control output, said radio frequency input being connected to receive the filtered signal from said band pass filter;
    an audioprocessing circuit connected to receive a signal from said audio output;
    a low pass filter connected to receive a signal from said audio output and having an output for subaudible frequencies;
    a square wave converter connected to the output of said low pass filter for producing a square wave with a subaudible frequency derived from the demodulator audio output signal;
    a microprocessor connected to said square wave converter for digitally processing the square wave therefrom and programmed to produce output signals in response to detection of desired-channel identification, undesired-channel identification, and no-channel identification;

a charge integrator having an up-down input, a bump input, and a reset input, said charge integrator having an output connected to said tunable demodulator tuning input, said bump input and said reset input being connected to receive output signals from said microprocessor;

means for receiving said automatic frequency control output of said tunable demodulator and controlling said charge integrator to charge up when said automatic frequency control output is below a predetermined target level and to charge down when it is above said target level;

said microprocessor being programmed to receive desired-channel designation data from an input thereof and to send a bump signal to said charge integrator in response to undesired-channel identification;

whereby a desired frequency multiplex channel signal can be located and locked-on by use of its channel identification coding without knowledge of the frequency at which said desired frequency multiplex channel signal is transmitted.

7. Apparatus as recited in claim 6 wherein said microprocessor is further programmed to send a reset signal to said charge integrator after said charge integrator has charged up to its maximum value.

8. Apparatus as recited in claim 7 wherein said bump signal is a short duration pulse and said reset signal is a long duration pulse.

9. Apparatus as recited in claim 6 wherein said subaudible frequencies are between about 25 Hz and about 100 Hz.

10. Apparatus as recited in claim 7 wherein said charge integrator comprises a semiconductor operational amplifier circuit.

11. Apparatus as recited in claim 6 wherein said automatic frequency control output target level is not more than 10 per cent below the maximum automatic frequency control output.

12. Apparatus as recited in claim 6 wherein said audio processing circuit includes means for separating a high frequency data carrier signal from said audio output.

13. A control system for receiving multichannel frequency multiplex satellite communication signals with channel identification coding comprising a receiver having a radio frequency output;

a tunable demodulator having a radio frequency input coupled to receive the output of said receiver, a tuning input, an audio output, and an automatic frequency control output;

an audio amplifier circuit connected to receive a signal from said audio output;

a filter connected to receive a signal from said audio output and having an output for inaudible frequencies;

a square wave converter connected to the output of said filter for producing a square wave derived from the demodulator audio output signal;

a microprocessor connected to said square wave converter for digitally processing the square wave therefrom and programmed to produce output signals in response to detection of desired-channel identification and undesired-channel identification;

a charge integrator having an up-down input, a bump input, and a reset input, said charge integrator having an output connected to said tunable demodulator tuning input, said bump input and said reset input being connected to receive output signals from said microprocessor;

means for receiving said automatic frequency control output of said tunable demodulator and controlling said charge integrator to charge up when said automatic frequency control output is below a predetermined target level and to charge down when it is above said target level;

said microprocessor being programmed to receive desired-channel designation data from an input thereof and to send a bump signal to said charge integrator in response to undesired-channel identification;

whereby a desired frequency multiplex channel signal can be located and locked-on by use of its channel identification coding without knowledge of the frequency at which said desired frequency multiplex channel signal is transmitted.

14. Apparatus as recited in claim 13 wherein said microprocessor is further programmed to send a reset signal to said charge integrator after said charge integrator has charged up to its maximum value.

15. Apparatus as recited in claim 14 wherein said bump signal is a short duration pulse and said reset signal is a long duration pulse.

16. Apparatus as recited in claim 13 wherein said charge integrator comprises a semiconductor operational amplifier circuit.

17. Apparatus as recited in claim 13 wherein said automatic frequency control output target level is not more than 10 per cent below the maximum automatic frequency control output.

18. Apparatus as recited in claim 13 further including an audio processing circuit with means for separating a high frequency data carrier signal from said audio output.

19. A control system for receiving multichannel frequency multiplex satellite communication signals with channel identification coding comprising a receiver having a radio frequency output;

a tunable demodulator having a radio frequency input coupled to receive the output of said receiver, a tuning input, an audio output, and an automatic frequency control output;

an audio amplifier circuit connected to receive a signal from said audio output;

signal processing means connected to said audio output processing the signal therefrom to produce output signals in response to detection of desired-channel identification and not-desired-channel identification;

a charge integrator having an up-down input and a bump input, said charge integrator having an output connected to said tunable demodulator tuning input, said bump input being connected to receive output signals from said signal processing means;

means for receiving said automatic frequency control output of said tunable demodulator and controlling said charge integrator to charge up when said automatic frequency control output is below a predetermined target level and to charge down when it is above said target level;

said signal processing means being adapted to send a bump signal to said charge integrator in response to not-desired-channel determination;

whereby a desired frequency multiplex channel signal can be located and locked-on by use of its channel identification coding without knowledge of the frequency at which said desired frequency multiplex channel signal is transmitted.

20. Apparatus as recited in claim 19 wherein said charge integrator comprises a semiconductor operational amplifier circuit.

* * * * *